United States Patent
Falke et al.

(10) Patent No.: US 6,583,192 B2
(45) Date of Patent: *Jun. 24, 2003

(54) PREPARATION OF FLEXIBLE POLYURETHANE FOAMS

(75) Inventors: Peter Falke, Schwarzheide (DE); Heinz-Jürgen Schröder, Meuro (DE); Lothar Baum, Schwarzheide (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/046,803

(22) Filed: Jan. 15, 2002

(65) Prior Publication Data

US 2002/0147247 A1 Oct. 10, 2002

(30) Foreign Application Priority Data

Feb. 6, 2001 (DE) ......................... 101 05 560

(51) Int. Cl.⁷ .............................. C08G 18/14
(52) U.S. Cl. .................. 521/130; 521/159; 521/170; 521/174
(58) Field of Search ............... 521/130, 159, 521/170, 174

(56) References Cited

U.S. PATENT DOCUMENTS

| | | | | |
|---|---|---|---|---|
| 5,306,737 A | * | 4/1994 | Burkhart et al. | 521/112 |
| 5,369,138 A | * | 11/1994 | Gansen | 521/159 |
| 5,420,170 A | * | 5/1995 | Lutter et al. | 252/182.24 |
| 5,521,226 A | * | 5/1996 | Bleys | 521/137 |
| 5,594,097 A | * | 1/1997 | Chaffanjon et al. | 252/182.27 |
| 5,686,502 A | * | 11/1997 | Murray et al. | 521/130 |
| 5,863,961 A | * | 1/1999 | Jacobs et al. | 521/174 |
| 6,156,864 A | * | 12/2000 | Ohkubo et al. | 521/159 |
| 6,239,186 B1 | * | 5/2001 | Mansfield et al. | 521/112 |
| 6,245,825 B1 | * | 6/2001 | Bleys | 521/137 |
| 6,322,722 B1 | * | 11/2001 | Bhattacharjee et al. | 252/182.24 |
| 6,391,933 B1 | * | 5/2002 | Mattesky | 521/114 |
| 6,417,241 B1 | * | 7/2002 | Huygens et al. | 521/130 |

* cited by examiner

Primary Examiner—John M. Cooney, Jr.
(74) Attorney, Agent, or Firm—Fernando A. Borrego

(57) ABSTRACT

Flexible polyurethane foams are prepared by reacting organic and/or modified organic polyisocyanates (a) with a polyetherol mixture (b) and, if required, further compounds (c) having hydrogen atoms reactive toward isocyanates, in the presence of water and/or other blowing agents (d), catalysts (e) and, if required, further assistants and additives (f), by a process in which the polyetherol mixture (b) consists of

- b1) at least one polyetherol which is at least difunctional, has an OH number of from 20 to 100 mg KOH/g and is based on propylene oxide and/or butylene oxide and ethylene oxide, having an ethylene oxide content of more than 40% by weight, based on the total amount of alkylene oxide used, and, if required, further polyetherols which are at least difunctional, are based on propylene oxide and/or butylene oxide and ethylene oxide and have an OH number of from 20 to 160 mg KOH/g and
- b2) at least one difunctional to hexafunctional polyetherol based on propylene oxide and/or butylene oxide and having an OH number of less than 800 mg KOH/g and the foams are prepared with indices of less than 110, the amount by weight of (b1) being greater than that of (b2). The flexible polyurethane foams prepared by this process are used for upholstery purposes, and insulation purposes, in vehicle construction and in the medical and hygiene sector.

8 Claims, No Drawings

PREPARATION OF FLEXIBLE POLYURETHANE FOAMS

The preparation of polyurethane foams by reacting organic and/or modified organic polyisocyanates and prepolymers with compounds which have a higher functionality and at least two reactive hydrogen atoms, for example polyoxyalkylenepolyamines and/or preferably organic polyhydroxy compounds, in particular polyetherols, having molecular weights of from 300 to 6000, and, if required, chain extenders and/or crosslinking agents having molecular weights of up to about 400, in the presence of catalysts, blowing agents, flameproofing agents, assistants and/or additives is known and has been widely described. A comprehensive overview of the preparation of polyurethane foams is given, for example, in Kunststoff-Handbuch, Volume VII, Polyurethane, 1st Edition 1966, edited by Dr. R. Vieweg and Dr. A. Höbchtlen, and 2nd Edition, 1983, and 3rd Edition, 1993, each edited by Dr. G. Oertel (Carl Hanser Verlag, Munich).

For various fields of use, in particular the production of upholstered furniture and reclining furniture, for insulation purposes, in vehicle construction and in applications in the medical and hygiene sector, it is frequently desirable to use foams which are extremely soft and at the same time have a high level of mechanical properties.

EP-A-433889 claims flexible foams which have low compressive strength and are based on block polyoxypropylenepolyoxyethylenepolyol mixtures, the content of primary OH groups being from 3 to 8% by weight. U.S. Pat. No. 4,950,695 describes a soft foam, a correspondingly flexible foam being obtained by the use of monofunctional polyetherols. Up to 25% of monools can be used there. EP-A-422080 likewise mentions the use of monofunctional polyols (up to 80%) for obtaining flexible polyurethane foams. EP-A-703254 claims soft foams which are obtained by a polyol combination with the use of chain extenders and primary amines (up to 1% by weight). These hot foams were prepared with an index of about 70 but must be subjected to a heat treatment at relatively high temperatures after production. EP-A-339369 mentions polyetherols having a higher functionality as cell-opening agents and compositions for improving the foam flexibility. The preferred amount for use is up to 5% by weight. In comparison, EP-A-913414 describes very flexible foams which were prepared using nonylphenol-initiated polyol species. An insufficient level of mechanical property is achieved there. EP-A-547764 claims resilient MDI foams, with the concomitant use of ethylene oxide-rich polyols in amounts of up to 30% by weight. EP-A-547765 describes flexible polyurethane foams based on ethylene oxide-rich polyols (>50% of ethylene oxide), a random distribution of the ethylene oxide being present within the polyether chain. The isocyanate used comprises >85% of 4,4'-MDI.

U.S. Pat. No. 4,929,646 describes an ethylene oxide-rich polyol having a high functionality as a cell-opening agent. According to U.S. Pat. No. 3,857,800, up to 15% of ethylene oxide-rich polyols are used in the polyol mixture in order to obtain better cell opening. In WO-A-97/23545, ethylene oxide-rich polyols are used in order to obtain hydrophilic flexible foams. Said polyols have a propylene oxide terminal block, resulting in high proportions of secondary OH groups. U.S. Pat. No. 5,011,908 claims flexible foams which may comprise up to 10% of ethylene oxide-rich polyetherols. Relatively resilient foams are obtained there.

EP-A-731120, EP-A-884338 and DE-A-19508079 describe sorbitol-based polyetherols having a relatively high functionality for the preparation of resilient flexible foams. By using such polyols which carry a terminal ethylene oxide block, the required process safety in the preparation of such resilient flexible foams is achieved. However, the foams thus prepared are relatively rigid. DE-A-19725020 claims resilient flexible foams in which in particular combinations of polyols having a high functionality and an ethylene oxide endcap and polymeric polyols are used. However, substantial rigidity is also obtained in the case of these foams. EP-A-733078 describes resilient foams. Once again, polyetherols having a high functionality are used for the slabstock foams thus produced. The processing latitude is within an index range of from 75 to 120. Ethylene oxide-rich polyols are present as cell-opening agents.

According to EP-A-549120, ethylene oxide-rich polyols and amino-containing chain extenders are used in order to obtain resilient flexible foams. In selected cases—as a rule ethylene oxide-rich polyetherols are also contained in the foam formulation—an attempt is made to establish an insulating character of the foams by special processing, in particular with pronounced undercrosslinking. As a rule, foaming is effected with an index of about 60–80. Thus, DE-A-3710731 describes a flexible foam of this type having sound-insulating and antidrumming properties. It is based on the fact that the elastic properties generally decrease with a decrease in the index.

DE-A-4129666 uses polyols which are incompatible with one another and which slowly separate, in order to establish the acoustic properties. The foams are processed with indices of <80, which can affect the mechanical properties. It is shown that the resilience of the foams decreases with a reduction in the index. Furthermore, the elongation properties deteriorate.

The inventions mentioned in the prior art all permit the preparation of flexible foams having medium hardness, there still being a notable potential for improvement with respect to the properties and the processability in the case of this class of substance.

It is an object of the present invention to provide flexible polyurethane foams which are easy to process, with the use of both tolylene diisocyanate and in particular diphenylmethane diisocyanate isomers, and which are extremely flexible and at the same time have a high level of mechanical properties.

We have found that this object is achieved, surprisingly, by using a polyetherol mixture (b) which consists of at least one polyetherol which is at least difunctional, has an OH number of from 20 to 100 mg KOH/g and is based on propylene oxide and/or butylene oxide and ethylene oxide, having an ethylene oxide content of more than 40% by weight, based on the total amount of alkylene oxide used, and, if required, further at least difunctional polyetherols based on propylene oxide and/or butylene oxide and ethylene oxide and having an OH number of from 20 to 160 mg KOH/g (b1) and at least one difunctional to hexafunctional polyetherol based on propylene oxide and/or butylene oxide and having an OH number of less than 800 mg KOH/g (b2) for the preparation of the flexible polyurethane foams, and preparing the foams with indices of less than 110, the amount by weight of (b1) being greater than that of (b2).

The present invention therefore relates to a process for the preparation of flexible polyurethane foams by reacting organic and/or modified organic polyisocyanates (a) with a polyetherol mixture (b) and, if required, further compounds (c) having hydrogen atoms reactive toward isocyanates, in the presence of water and/or other blowing agents (d), catalysts (e) and, if required, further assistants and additives (f), wherein the polyetherol mixture (b) consists of b1) at least one polyetherol which is at least difunctional, has an OH number of from 20 to 100 mg KOH/g and is based on propylene oxide and/or butylene oxide and ethylene oxide, having an ethylene oxide content of more than 40% by weight, based on the total amount of alkylene oxide used, and, if required, further polyetherols which are at least difunctional, are based on propylene oxide and/or butylene oxide and ethylene oxide and have an OH number of from 20 to 160 mg KOH/g, and b2) at least one difunctional to hexafunctional polyetherol based on propylene oxide and/or butylene oxide and having an OH number of less than 800 mg KOH/g and the foams are prepared with indices of less than 110, the amount by weight of (b1) being greater than that of (b2).

The present invention furthermore relates to flexible polyurethane foams themselves prepared by this process and their use for upholstery purposes, insulation purposes, in vehicle construction and in the medical and hygiene sector.

In our investigations, we surprisingly found that the use of the novel combination of polyols (b) in the stated ratio resulted in a flexible foam whose resilience increases considerably with decreasing index. The person skilled in the art would actually have expected that limp highly insulating foams would result with decreasing index owing to the chain terminations occurring thereby. This principle is used, inter alia, to obtain highly insulating flexible carpet foams which are then processed in an index range of <80.

Regarding the components used according to the invention in the polyol mixture, the following may be stated:

The component (b1) consists of at least one polyetherol which is at least difunctional, has an OH number of from 20 to 100 mg KOH/g and is based on propylene oxide and/or butylene oxide and ethylene oxide, having an ethylene oxide content of more than 40, preferably more than 60, % by weight, based in each case on the total amount of alkylene oxide used.

For example, the following are suitable as (b1): polyetherols based on ethylene glycol, glycerol or trimethylolpropane as initiator with a terminal ethylene oxide block or with random incorporation of the ethylene oxide. Polyetherols based on glycerol and having an ethylene oxide endcap are preferably used, but a propylene oxide endcap may also be employed.

In addition to the polyetherols described, further at least difunctional polyetherols based on propylene oxide and/or butylene oxide and ethylene oxide and having an OH number of from 20 to 160 mg KOH/g can, if required, be concomitantly used.

Examples of suitable initiators for this purpose are glycerol, trimethylolpropane, pentaerythritol and sorbitol.

The polyetherols having an OH number of from 20 to 100 mg KOH/g and an ethylene oxide content of more than 40% by weight should preferably contain at least 60, preferably >80, % by weight, based on the total amount of the polyetherols (b1) used.

The component (b2) consists of at least one difunctional to hexafunctional polyetherol based on propylene oxide and/or butylene oxide and having an OH number of less than 800, preferably <500, mg KOH/g.

For example, the following are suitable as (b2): polyetherols based on propylene glycol, glycerol, tolylenediamine and sorbitol and propylene oxide. Polypropylene glycol based on propylene glycol or glycerol is preferably used.

According to the invention, the amount by weight of (b1) is greater than that of (b2).

The weight ratio of component (b1) to component (b2) is preferably from 2:1 to 40:1, advantageously from 2:1 to 25:1, particularly preferably from 2:1 to 15:1.

Said polyetherols are prepared by known processes, as described by way of example further below.

The novel flexible polyurethane foams are prepared by reacting organic and/or modified organic polyisocyanates (a) with the polyetherol mixture (b) described above and, if required, further compounds (c) having hydrogen atoms reactive toward isocyanates, in the presence of water and/or other blowing agents (d), catalysts (e) and, if required, further assistants and additives (f).

The foams are prepared, according to the invention, with indices of less than 110, preferably less than 95, particularly preferably less than 75.

Regarding the further starting components to be used, the following may be stated specifically:

Suitable organic polyisocyanates (a) for the preparation of the novel polyurethanes are the aliphatic, cycloaliphatic, araliphatic and preferably aromatic polyfunctional isocyanates known per se.

Specific examples are alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (IPDI), hexahydrotolylene 2,4- and 2,6-diisocyanate and the corresponding isomer mixtures, dicyclohexylmethane 4,4'-, 2,2'- and 2,4'-diisocyanate and the corresponding isomer mixtures, and preferably aromatic di- and polyisocyanates, e.g. tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic di- and polyisocyanates can be used individually or in the form of their mixtures.

Tolylene diisocyanate, mixtures of diphenylmethane diisocyanate isomers, mixtures of diphenylmethane diisocyanate and crude MDI or tolylene diisocyanate with diphenylmethane diisocyanate and/or crude MDI are preferably used. Mixtures of diphenylmethane diisocyanate isomers with at least 30% by weight of diphenylmethane 2,4'-diisocyanate are particularly preferably used.

Frequently, modified polyfunctional isocyanates, i.e. products which are obtained by chemical reaction of organic di- and/or polyisocyanates, are also used. Examples are di- and/or polyisocyanates containing ester, urea, biuret, allophanate, carbodiimide, isocyanurate, uretdione and/or urethane groups. Specific examples are organic, preferably aromatic polyisocyanates containing urethane groups and having NCO contents of from 43 to 15, preferably from 31 to 21, % by weight, based on the total weight, diphenylmethane 4,4'-diisocyanate modified by reaction with, for example, low molecular weight diols, triols, dialkylene glycols, trialkylene glycols or polyoxyalkylene glycols having molecular weights of up to 6 000, in particular up to 1 500, modified diphenylmethane 4,4'- and 2,4' diisocyanate mixtures or modified crude MDI or tolylene 2,4- and 2,6-diisocyanate. The di- and polyoxyalkylene glycols can be used individually or as mixtures, examples being diethylene and dipropylene glycol, polyoxyethylene, polyoxypropylene and polyoxypropylenepolyoxyethylene glycols, -triols and -tetraols. NCO-containing prepolymers having NCO contents of from 25 to 3.5, preferably from 21 to 14, % by weight, based on the total weight, prepared from the polyesterpolyols and/or preferably polyetherpolyols described below and diphenylmethane 4,4'-diisocyanate, mixtures of diphenylmethane 2,4'- and 4,4'-diisocyanate, tolylene 2,4'- and/or 2,6'-diisocyanates or crude MDI, are also suitable. Liquid polyisocyanates containing carbodiimide groups and/or isocyanurate rings and having NCO contents of from 43 to 15, preferably from 31 to 21, % by weight, based on the total weight, for example based on diphenylmethane 4,4'-, 2,4'- and/or 2,2'-diisocyanate and/or tolylene 2,4- and/or 2,6-diisocyanate have furthermore proven useful.

The modified polyisocyanates can be mixed with one another or with unmodified organic polyisocyanates, e.g. diphenylmethane 2,4'- or 4,4'-diisocyanate, crude MDI, tolylene 2,4- and/or 2,6-diisocyanate.

Modified organic polyisocyanates which have proven particularly useful are NCO-containing prepolymers which are advantageously formed from the reaction of the isocyanates (a) with the polyetherols (b) and, if required, compounds of components (c) and/or (d).

In addition to the polyetherol mixture (b) described above and used according to the invention, further compounds (c) having hydrogen atoms reactive toward isocyanates may be present if required.

Compounds having at least two reactive hydrogen atoms are primarily suitable for this purpose. Those having a functionality of from 2 to 8, preferably from 2 to 3, and an average molecular weight of from 300 to 8 000, preferably from 300 to 5 000, are expediently used. The hydroxyl number of the polyhydroxy compounds is as a rule from 20 to 160, preferably from 28 to 56.

The polyetherpolyols used in the components (b) and (c) are prepared by known processes, for example by anionic polymerization with alkali metal hydroxides, e.g. sodium hydroxide or potassium hydroxide, or alkali metal alcoholates, e.g. sodium methylate, sodium ethylate, potassium ethylate or potassium isopropylate, as catalysts and with the addition of at least one initiator which contains from 2 to 8, preferably 2 or 3, reactive hydrogen atoms bonded per molecule, or by cationic polymerization with Lewis acids, such as antimony pentachloride, boron fluoride etherate, etc., or bleaching earth as catalysts or by double metal cyanide catalysis from one or more alkylene oxides having 2 to 4 carbon atoms in the alkylene radical. For special purposes, monofunctional initiators may also be incorporated into the polyether structure.

Suitable alkylene oxides are, for example, tetrahydrofuran, 1,3-propylene oxide, 1,2- and 2,3-butylene oxide, styrene oxide and preferably ethylene oxide and 1,2-propylene oxide. The alkylene oxides can be used individually, alternately in succession or as mixtures.

Examples of suitable initiator molecules are water, organic dicarboxylic acids, such as succinic acid, adipic acid, phthalic acid and terephthalic acid, aliphatic and aromatic, unsubstituted or N-monoalkyl-, N,N-dialkyl- and N,N'-dialkyl-substituted diamines having 1 to 4 carbon atoms in the alkyl radical, such as unsubstituted or monoalkyl- or dialkyl-substituted ethylenediamine, diethylenetriamine, triethylenetetramine, 1,3-propylenediamine, 1,3- or 1,4-butylenediamine, 1,2-, 1,3-, 1,4-, 1,5- or 1,6-hexamethylenediamine, phenylenediamine, 2,3-, 2,4- or 2,6-tolylenediamine or 4,4'-, 2,4'- or 2,2'-diaminodiphenylmethane. Other suitable initiator molecules are alkanolamines, e.g. ethanolamine and N-methyl- and N-ethylethanolamine, dialkanolamines, e.g. diethanolamine and N-methyl- and N-ethyldiethanolamine, and trialkanolamines, e.g. triethanolamine, and ammonia. Polyhydric, in particular dihydric and/or trihydric, alcohols, such as ethanediol, 1,2- and 2,3-propanediol, diethylene glycol, dipropylene glycol, 1,4-butanediol, 1,6-hexanediol, glycerol, trimethylolpropane and pentaerythritol, are preferably used.

The polyetherpolyols, preferably polyoxypropylene- and polyoxypropylenepolyoxyethylene polyols, have a functionality of, preferably, from 2 to 8, in particular from 2 to 3, and molecular weights of from 300 to 8 000, preferably from 300 to 6 000, in particular from 1 000 to 5 000, and suitable polyoxytetramethylene glycols have a molecular weight of up to about 3 500.

Other suitable polyetherpolyols are polymer-modified polyetherpolyols, preferably graft polyetherpolyols, in particular those based on styrene and/or acrylonitrile, which are prepared by in situ polymerization of acrylonitrile, styrene or preferably mixtures of styrene and acrylonitrile, for example in a weight ratio of from 90:10 to 10:90, preferably from 70:30 to 30:70, expediently in the abovementioned polyetherpolyols, analogously to German Patents 1111394, 1222669 (U.S. Pat. Nos. 3,304,273, 3,383,351, 3,523,093), 1152536 (GB 1040452) and 1152537 (GB 987618), and polyetherpolyol dispersions which contain, as the disperse phase, usually in an amount of from 1 to 50, preferably from 2 to 25, % by weight, for example polyureas, polyhydrazides, polyurethanes containing bonded tertiary amino groups and/or melamine and which are described, for example, in EP-B-011752 (U.S. Pat. No. 4,304,708), U.S. Pat No. 4,374,209 and DE-A-3231497.

The polyetherpolyols can be used individually or in the form of mixtures.

In addition to the polyetherpolyols described, for example, polyetherpolyamines and/or further polyols selected from the group consisting of the polyesterpolyols, polythioetherpolyols, polyesteramides, hydroxyl-containing polyacetals and hydroxyl-containing aliphatic polycarbonates or mixtures of at least two of said polyols may also be used. The hydroxyl number of the polyhydroxy compounds is as a rule from 20 to 80, preferably from 28 to 56.

Suitable polyesterpolyols can be prepared, for example, from organic dicarboxylic acids of 2 to 12 carbon atoms, preferably aliphatic dicarboxylic acids of 4 to 6 carbon atoms, polyhydric alcohols, preferably diols, of 2 to 12, preferably 2 to 6, carbon atoms, by conventional processes. Usually, the organic polycarboxylic acids and/or derivatives thereof and polyhydric alcohols are subjected to polycondensation, advantageously in a molar ratio of from 1:1 to 1:1.8, preferably from 1:1.05 to 1:1.2, in the absence of a catalyst or preferably in the presence of esterification catalysts, expediently in an atmosphere comprising inert gas, e.g. nitrogen, carbon monoxide, helium, argon, etc., in the melt at from 150 to 250° C., preferably from 180 to 220° C., under atmospheric or reduced pressure, until the desired acid number is obtained, which is advantageously less than 10, preferably less than 2.

Examples of suitable hydroxyl-containing polyacetals are the compounds which can be prepared from glycols, such as diethylene glycol, triethylene glycol, 4,4'-dihydroxyethoxydiphenyldimethylmethane or hexanediol, and formaldehyde. Suitable polyacetals can also be prepared by polymerization of cyclic acetals. Suitable hydroxyl-containing polycarbonates are those of the type known per se, which can be prepared, for example, by reacting diols, such as 1,3-propanediol, 1,4-butanediol and/or 1,6-hexanediol, diethylene glycol, triethylene glycol or tetraethylene glycol, with diaryl carbonates, e.g. diphenyl carbonate or phosgene. The polyesteramides include, for example, the predominantly linear condensates obtained from polybasic, saturated and/or unsaturated carboxylic acids or their anhydrides and polyhydric saturated and/or unsaturated amino alcohols or mixtures of polyhydric alcohols and amino alcohols and/or polyamines. Suitable polyetherpolyamines can be prepared from the abovementioned polyetherpolyols by known processes. The cyanoalkylation of polyoxyalkylenepolyols and subsequent hydrogenation of the nitrile formed (U.S. Pat. No. 3,267,050) or the partial or complete amination of polyoxyalkylenepolyols with amines or ammonia in the presence of hydrogen and catalysts (DE-A-1215373) may be mentioned by way of example.

The compounds of component (c) can be used individually or in the form of mixtures.

The flexible polyurethane foams can be prepared in the presence or absence of chain extenders and/or crosslinking agents, but these are generally not required. The chain extenders and/or crosslinking agents used are diols and/or triols having molecular weights of less than 400, preferably from 60 to 300. For example, aliphatic, cycloaliphatic and/or araliphatic diols of 2 to 14, preferably 4 to 10, carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroquinone, triols, such as 1,2,4- and 1,3,5-trihydroxycyclohexane, triethanolamine, diethanolamine, glycerol and trimethylolpropane, and low molecular weight hydroxyl-containing polyalkylene oxides based on ethylene oxide and/or 1,2-propylene oxide and the abovementioned triols and/or diols are suitable as initiator molecules.

If chain extenders, crosslinking agents or mixtures thereof are used for the preparation of the polyurethane foams, they are expediently used in an amount of up to 10% by weight, based on the weight of the polyol compounds.

The blowing agents (d) used may be the chlorofluorocarbons (CFCs) generally known from polyurethane chemistry as well as highly fluorinated and/or perfluorinated hydrocarbons. However, the use of these substances is greatly restricted or has been completely discontinued for ecological reasons. In addition to chlorofluorocarbons and fluorocarbons, in particular aliphatic and/or cycloaliphatic hydrocarbons, especially pentane and cyclopentane, or acetals, e.g. methylal, are possible alternative blowing agents. These physical blowing agents are usually added to the polyol component of the system. However, they can also be added to the isocyanate component or as a combination of both the polyol component and the isocyanate component. Their use together with highly fluorinated and/or perfluorinated hydrocarbons, in the form of an emulsion of the polyol component, is also possible. Emulsifiers, if used, are usually oligomeric acrylates which contain polyoxyalkylene and fluoroalkane radicals bonded as side groups and have a fluorine content of from about 5 to 30% by weight. Such products are sufficiently well known from plastics chemistry (e.g. EP-A-0351614). The amount of blowing agent or of blowing agent mixture used is from 1 to 25, preferably from 1 to 15, % by weight, based in each case on the total weight of the components (b) to (d).

It is also possible and usual to add water in an amount of from 0.5 to 15, preferably from 1 to 5, % by weight, based on the total weight of the components (b) to (f), as blowing agent to the polyol component. The addition of water can be effected in combination with the use of the other blowing agents described.

For the purposes of the present invention, water is preferably used as the blowing agent.

Catalysts (e) used for the preparation of the flexible polyurethane foams are in particular compounds which greatly accelerate the reaction of the reactive hydrogen atoms, in particular of hydroxyl-containing compounds of components (b), (c) and (d), with the organic, unmodified or modified polyisocyanates (a). Organic metal compounds, preferably organic tin compounds, such as tin(II) salts of organic carboxylic acids, e.g. tin(II) acetate, tin(II) octanoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, are suitable. The organic metal compounds are used alone or, preferably, in combination with strongly basic amines. Examples are amidines, such as 2,3-dimethyl-3,4,5,6-tetrahydropyrimidine, tertiary amines, such as triethylamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and preferably 1,4-diazabicyclo[2.2.2]octane, and aminoalkanol compounds, such as triethanolamine, triisopropanolamine, N-methyl- and N-ethyldiethanolamine and dimethylethanolamine.

Other suitable catalysts are tris(dialkylaminoalkyl)-s-hexahydrotriazines, in particular tetraalkylammonium hydroxides, such as tetramethylammonium hydroxide, alkali metal hydroxides, such as sodium hydroxide, and alkali metal alcoholates, such as sodium methylate and potassium isopropylate, and alkali metal salts of long-chain fatty acids having 10 to 20 carbon atoms and, if required, OH side groups. From 0.001 to 5, in particular from 0.05 to 2, % by weight, based on the weight of the components (b) to (f), of catalyst or catalyst combination are preferably used.

If required, further assistants and/or additives (f) may also be incorporated into the reaction mixture for the preparation of the novel flexible poluretane foams. Examples are flameproofing agents, stabilizers, fillers, dyes, pigments and hydrolysis stabilizers as well as fungistatic and bacteriostatic substances.

Suitable flameproofing agents are, for example, tricresyl phosphate, tris(2-chloroethyl)phosphate, tris(2-chloropropyl)phosphate, tetrakis(2-chloroethyl)ethylene diphosphate, dimethyl methanephosphonate, diethyl diethanolaminomethylphosphonate and commercial halogen-containing polyol flameproofing agents. In addition to the abovementioned halogen-substituted phosphates, inorganic or organic flameproofing agents, such as red phosphorus, hydrated alumina, antimony trioxide, arsenic oxide, ammonium polyphosphate and calcium sulfate, expanded graphite or cyanuric acid derivatives, e.g. melamine, or mixtures of at least two flameproofing agents, for example ammonium polyphosphates and melamine, and, if required, corn starch or ammonium polyphosphate, melamine and expanded graphite and/or, if required, aromatic polyesters may also be used for flameproofing the polyisocyanate polyadducts. Additions of melamine have proven particularly effective. In general, it has proven expedient to use from 5 to 50, preferably from 5 to 25, parts by weight of said flameproofing agents per 100 parts by weight of the components (b) to (f).

Stabilizers used are in particular surfactants, i.e. compounds which serve for supporting the homogenization of the starting materials and may also be suitable for regulating the cell structure of the plastics. Examples are emulsifiers, such as sodium salts of castor oil sulfates or fatty acids and salts of fatty acids with amines, for example of oleic acid with diethylamine, of stearic acid with diethanolamine and of ricinoleic acid with diethanolamine, salts of sulfonic acids, for example alkali metal or ammonium salts of dodecylbenzene- or dinaphthylmethanedisulfonic acid and ricinoleic acid; foam stabilizers, such as siloxane/oxyalkylene copolymers and other organopolysiloxanes, oxyethylated alkylphenols, oxyethylated fatty alcohols, liquid paraffins, castor oil esters and ricinoleic esters, turkey red oil and groundnut oil, and cell regulators, such as paraffins, fatty alcohols and dimethylpolysiloxanes. Predominantly used stabilizers are organopolysiloxanes which are water-soluble. These are polydimethylsiloxane radicals onto which a polyether chain comprising ethylene oxide and propylene oxide has been grafted.

The surfactants are usually used in amounts of from 0.01 to 5 parts by weight, based on 100 parts by weight of the components (b) to (f).

Fillers, in particular reinforcing fillers, are to be understood as meaning the conventional organic and inorganic fillers, reinforcing agents, weighting agents, compositions for improving the abrasion behavior in paints, coating materials, etc., which are known per se. Specific examples are inorganic fillers, such as silicate minerals, for example sheet silicates, such as antigorite, serpentine, hornblends, amphiboles, chrysotile and talc, metal oxides, such as kaolin, aluminas, titanium oxides and iron oxides, metal salts, such as chalk, barite and inorganic pigments, such as cadmium sulfide and zinc sulfide, and glass, etc. Kaolin (china clay), aluminum silicate and coprecipitates of barium sulfate and aluminum silicate as well as natural and synthetic fibrous minerals, such as wollastonite, metal fibers and in particular glass fibers of different lengths, which, if required, may be sized, are preferably used. Examples of suitable organic fillers are carbon, rosin, cyclopentadienyl resins and graft polymers as well as cellulose fibers, polyamide, polyacrylonitrile, polyurethane and polyester fibers based on aromatic and/or aliphatic dicarboxylic esters and in particular carbon fibers. The inorganic and organic fillers may be used individually or as mixtures and are advantageously incorporated into the reaction mixture in amounts of from 0.5 to 50, preferably from 1 to 40, % by weight, based on the weight of the components (a) to (f), but the contents of mats, nonwovens and fabrics of natural and synthetic fibers may reach values of up to 80.

Further details regarding the abovementioned other conventional assistants and additives appear in the technical literature, for example the monograph by J. H. Saunders and K. C. Frisch, High Polymers, Volume XVI, Polyurethanes, Parts 1 and 2, Verlag Interscience Publishers 1962 and 1964, or the above-cited Kunststoffhandbuch, Polyurethane, Volume VII, Hanser-Verlag, Munich, Vienna, 1st to 3rd Editions.

For the preparation of the novel foams, the organic and/or modified organic polyisocyanates (a), the polyetherol mixture (b) and, if required, further compounds (c) having hydrogen atoms reactive toward isocyanates and further components (d) to (f) are reacted in amounts such that the ratio of the number of equivalents of NCO groups of the polyisocyanates (a) to the sum of the reactive hydrogen atoms of the components (b) to (f) is less than 0.95:1, preferably less than 0.70:1.

Polyurethane foams obtained by the novel process are advantageously prepared by the one-shot method, for example with the aid of the high pressure or low pressure technique, in open or closed molds, for example metallic molds. Continuous application of the reaction mixture to suitable belt lines for producing slabstock foams is also usual.

It has proven particularly advantageous to employ the two-component process and to combine the components (b) to (f) into a polyol component, often also referred to as component A, and to use the organic and/or modified organic polyisocyanates (a), particularly preferably an NCO prepolymer or mixtures of this prepolymer and further polyisocyanates and, if required, blowing agents (d) as the isocyanate component, often also referred to as component B.

The starting components are mixed at from 15 to 90° C., preferably from 20 to 60° C., in particular from 20 to 35° C. and are introduced into the open mold or, if required, under superatmospheric pressure into the closed mold or, in the case of a continuous workstation, are applied to a belt which receives the reaction material. The mixing can be carried out mechanically by means of a stirrer, by means of a stirring screw or by high-pressure mixing in a nozzle. The mold temperature is expediently from 20 to 110° C., preferably from 30 to 60° C., in particular from 35 to 55° C.

The polyurethane foams prepared by the novel process have a density of from 10 to 800, preferably from 30 to 100, in particular from 30 to 80, kg/m$^3$. The indentation hardness is preferably less than 100 N, in particular less than 50 N.

The SAG factor is less than 3.0 and shows that such foams retain their flexible behavior even in the case of a relatively high indentation value. The SAG factor is the ratio of the force at 65% compression to the force at 25% compression, the measurements being effected according to DIN 53577.

In the case of the novel foams, the isocyanate index is inversely dependent on the resilience (DIN 53573). The loss factor (Iso 7626, Part 1,2) decreases with decreasing index. The resilience of the foams thus increases greatly with decreasing index.

The novel polyurethane foams are particularly suitable as upholstery material for seats in the furniture sector, for insulation purposes, in vehicle construction and in the medical and hygiene sector.

The examples which follow illustrate the invention without restricting it.

A flexible polyurethane foam based on the components shown in table 1 is molded at a mold temperature of 50° C.

| | |
|---|---|
| Polyol 1 | OH number 42 mg KOH/g, polyetheralcohol based on propylene oxide and ethylene oxide (72%), glycerol initiator (BASF); |
| Polyol 1a | OH number 35 mg KOH/g, polyetheralcohol based on propylene oxide and ethylene oxide, glycerol initiator (BASF); |
| Polyol 2 | OH number 55 mg KOH/g, polyetheralcohol based on propylene oxide, propylene glycol initiator (BASF); |
| Lupragen ® N 206 | Amine catalyst (BASF); |
| Lupragen ® N 201 | Amine catalyst (BASF); |
| Silicone stabilizers (Air Products) | DC 198; |
| Lupranat ® MI | 33.6% NCO, isomer mixture 4,4'-MDI and 2,4'-MDI; |

TABLE 1

Effect of index

| Example | | 1 | 2 | 3 | 4 | 5 | 6 |
|---|---|---|---|---|---|---|---|
| Polyol 1 | pbw | 77.15 | 77.15 | 77.15 | 78 | 78 | 78 |
| Polyol 2 | pbw | 16 | 16 | 16 | 16 | 16 | 16 |
| Polyol 1a | pbw | 2 | 2 | 2 | 2 | 2 | 2 |
| Lupragen N 201 | pbw | 0.2 | 0.2 | 0.2 | 0.1 | 0.1 | 0.1 |
| Lupragen N 206 | pbw | 0.15 | 0.15 | 0.15 | 0.5 | 0.5 | 0.5 |
| Silicone stabilizer | pbw | 1.5 | 1.5 | 1.5 | 1.5 | 1.5 | 1.5 |
| Water | pbw | 3 | 3 | 3 | 2 | 2 | 2 |
| Lupranat® 0 M20A | pbw | 20 | 20 | 20 | 20 | 20 | 20 |
| Lupranat® MI | pbw | 80 | 80 | 80 | 80 | 80 | 80 |
| Index | | 85 | 95 | 105 | 85 | 95 | 105 |
| Density* | kg/m$^3$ | 47.5 | 46.0 | 44.9 | n.d. | 75.7 | 76.5 |
| CS (70° C.)* | % | 1.75 | 0.93 | 1.18 | n.d. | 1.06 | 0.8 |
| Compressive strength* | kPa | 0.8 | 1.1 | 1.4 | n.d. | 4.67 | 6 |
| Indentation hardness* | N | 46 | 59 | 70 | n.d. | n.d. | n.d. |
| Resilience* | % | 15 | 19 | 15 | n.d. | 49.5 | 41.7 |
| Density** | kg/m$^3$ | 72.9 | 67.8 | 68 | 84.2 | 80.9 | 84.6 |
| Siorage modulus** | N/cm$^2$ | 2.4 | 1.9 | 6.2 | 1.6 | 1.7 | 2 |
| Loss factor** | | 0.671 | 0.744 | 1.053 | 0.23 | 0.292 | 2.339 |

*14.5 1 mold;
**Carpet test plate (20 × 20 × 2 cm);
CS Compression set

From the table, it is evident that the resilience decreases and the loss factor increases with increasing index.

We claim:

1. A process for the preparation of flexible polyurethane foams comprising reacting organic and/or modified organic polyisocyanates (a) with a polyetherol mixture (b) and, optionally, further isocyanates, in the presence of water and/or other blowing agents (d), catalysts (e) and, optionally further assistants and additives (f), wherein the polyetherol mixture (b) comprises b1) at least one polyetherol which is at least difunctional, has an OH number of from 20 to 100 mg KOH/g and is based on propylene oxide and/or butylene oxide and ethylene oxide, having an ethylene oxide content of more than 60% by weight, based on the total amount of alkylene oxide used, and, optionally, further polyetherols which are at least difunctional, are based on propylene oxide and/or butylene oxide and ethylene oxide and have an OH number of from 20 to 160 mg KOH/g, and b2) at least one difunctional to hexafunctional polyetherol free of ethylene oxide and based on propylene oxide and/or butylene oxide and having an OH number of less than 800 mg KOH/g wherein the foams are prepared with indices of less than 110, and the amount by weight of (b1) is greater than that of (b2) such that the weight ratio of (b1) to (b2) is from 2:1 to 40:1.

2. A process as claimed in claim 1, wherein the ratio of the amount by weight of (b1) to amount by weight of (b2) is from 2:1 to 40:1.

3. A process as claimed in claim 1, wherein the foams are prepared with indices of less than 75.

4. A process as claimed in claim 1, wherein the organic and/or modified organic polyisocyanates (a) comprise tolylene diisocyanate, mixtures of diphenylmethane diisocyanate isomers, mixtures of diphenylmethane diisocyanate and polyphenylpolymethylene polyisocyanate or tolylene diisocyanate with diphenylmethane diisocyanate and/or polyphenylpolymethylene polyisocyanate.

5. A process as claimed in claim 1, wherein the organic and/or modified organic polyisocyanates (a) comprise NCO-containing prepolymers, formed from the reaction of the isocyanates (a) with the polyetherols (b) and, optionally, the components (c) and/or (d).

6. A flexible polyurethane foam, which is prepared in accordance with a process as claimed in any of claims 1 to 5.

7. A flexible polyurethane foam as claimed in claim 6, which has a SAG factor of less than 3.0, the SAG factor being the ratio of the force at 65% compression to the force at 25% compression, measured according to DIN 53577.

8. A flexible polyurethane foam as claimed in claim 6 or 7, which has an indentation hardness of less than 100 N.

* * * * *